Oct. 12, 1965     C. B. ANDERSON     3,211,022

POSITIVE DRIVE DIFFERENTIAL

Filed May 6, 1963     3 Sheets-Sheet 1

INVENTOR:
CHESTER B. ANDERSON
BY
ATTORNEYS.

INVENTOR:
CHESTER B. ANDERSON
BY
ATTORNEYS.

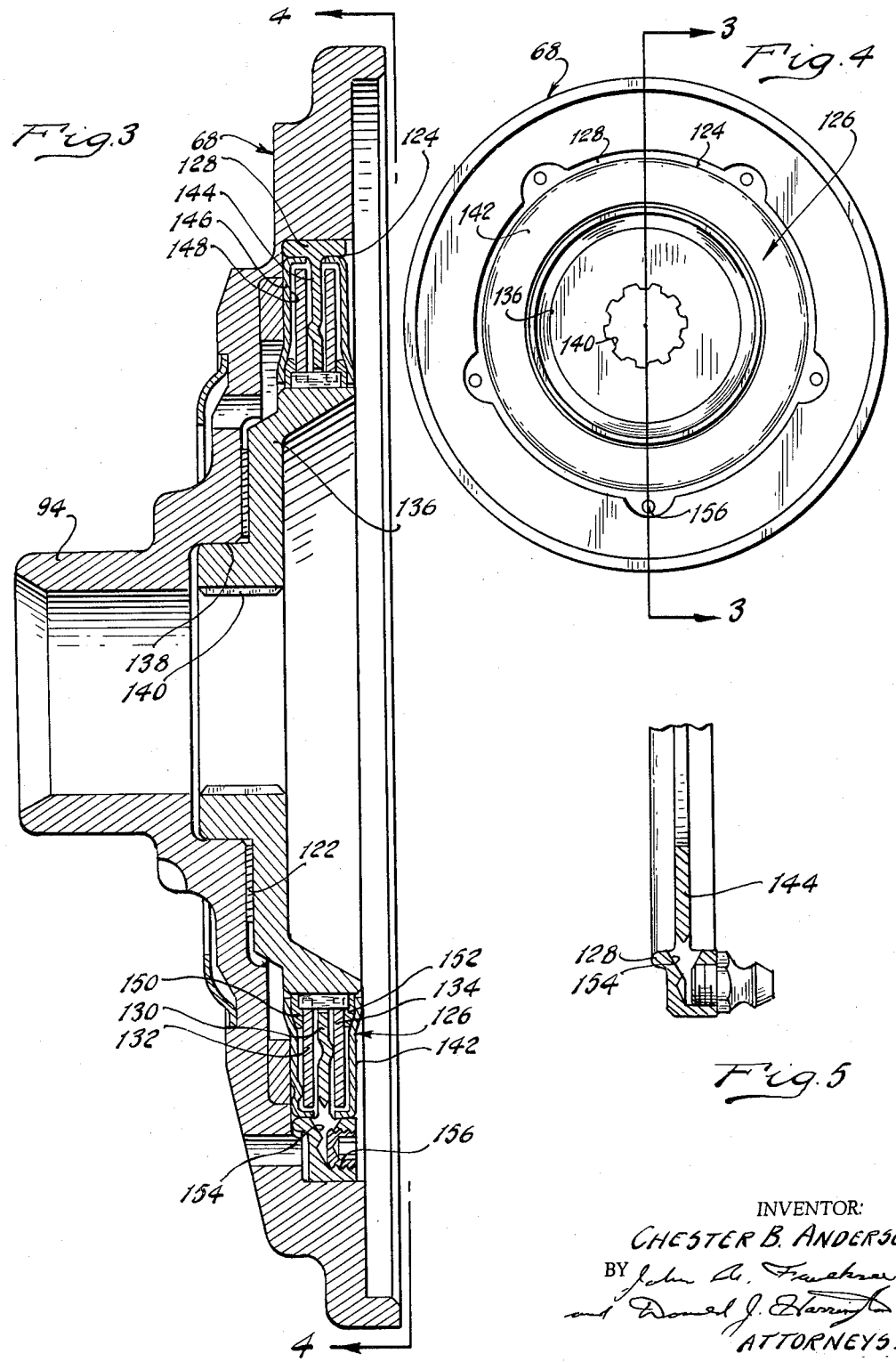

United States Patent Office 3,211,022
Patented Oct. 12, 1965

3,211,022
POSITIVE DRIVE DIFFERENTIAL
Chester B. Anderson, Birmingham, Mich., assignor to Ford Motor Company, Dearborn, Mich., a corporation of Delaware
Filed May 6, 1963, Ser. No. 278,221
3 Claims. (Cl. 74—711)

My invention relates generally to geared differential drives, and more particularly to a positive traction differential drive mechanism capable of being used with a wheeled automotive vehicle.

It is common practice in the automotive industry to utilize differential drive mechanisms that are capable of establishing a right angle torque delivery path between an engine driven drive shaft and a transversely disposed axle shaft that in turn powers the traction wheels of a vehicle. The differential drive mechanism comprises a differential carrier upon which is situated a ring gear. A bevel pinion drives the ring gear. It in turn is connected to a drive shaft through a universal joint.

The carrier supports idler pinions which drivably engage two differential side gears, one side gear being connected to one axle shaft and the other side gear being connected to another axle shaft. The extended end of each axle shaft is connected to a vehicle traction wheel.

In an arrangement of this type, the driving torque delivered to the differential carrier is transmitted to each vehicle traction wheel if the degrees of traction for the traction wheels are equal. The magnitude of the torque delivered to each axle shaft then is balanced with respect to the torque being delivered to the other. But if one traction wheel loses traction for any reason, the other traction wheel having the higher degree of traction will function as a reaction member and the one wheel will spin.

Under these conditions, it is difficult to extricate the vehicle from mud holes or maneuver the vehicle when one wheel rests upon a slippery road surface.

I have overcome this shortcoming by providing a positive drive differential mechanism which includes clutch structure for connecting together one of the differential side gears to the associated differential carrier. Under normal "straight-ahead" driving operation, relative motion between the side gears and the carrier does not take place. If the vehicle maneuvers a turn, however, relative motion will occur. This permits the outermost wheel to speed up with respect to the innermost wheel without interrupting the torque delivery to either one. This relative motion is resisted by my improved clutch structure. This same resistance will prevent one side gear from decreasing in speed with respect to the other when one wheel loses traction.

My improved clutch structure employs a viscous fluid contained within a chamber that also encloses relatively movable friction elements, one of which is connected to the carrier and the other of which is connected to one of the side gears. Relative motion of the friction elements then is resisted by reason of the shearing action of the viscous fluid as relative motion develops between the carrier and the side gear.

This clutching action establishes an automatic locking differential characteristic without the need for employing constantly engaged friction discs and without the necessity for providing an automatic clutch engaging mechanism as in certain prior art differential drives.

The provision of an improved positive drive differential of the type above set forth being a principal object of my invention, it is a further object of my invention to provide a differential mechanism for use with a wheeled vehicle wherein provision is made for equally dividing torque between each of two traction wheels which are connected to the driven members of the differential mechanism.

It is a further object of my invention to provide a differential mechanism of the type above set forth wherein a clutching action is proportional in magnitude to the rate of relative motion between the traction wheels that are powered by the differential mechanism.

It is a further object of my invention to provide a minimum slip vehicle differential having a reaction torque delivery clutch that is adapted to reduce unequal torque distribution therethrough and which includes elements that are entirely self-contained and require a minimum amount of maintenance.

It is a further object of my invention to provide a differential mechanism having positive drive characteristics wherein conventional differential drive components can be employed.

It is a further object of my invention to provide a differential mechanism wherein a clutching action may be obtained between relatively movable torque delivery elements of the mechanism and wherein provision is made for removing the clutch structure to adapt the mechanism for normal differential action without a positive drive characteristic.

For the purpose of describing the structural features and mode of operation of an embodiment of my invention, reference will be made to the accompanying drawings, wherein:

FIGURE 3 shows an enlargement of a portion of the structure of FIGURE 1.

FIGURE 4 is a plan view of the structure of FIGURE 3 and is taken along the plane of section line 4—4 of FIGURE 3; and FIGURE 5 shows a fitting that is used for filling the clutch structure with silicone fluid or the like.

Figure 1:
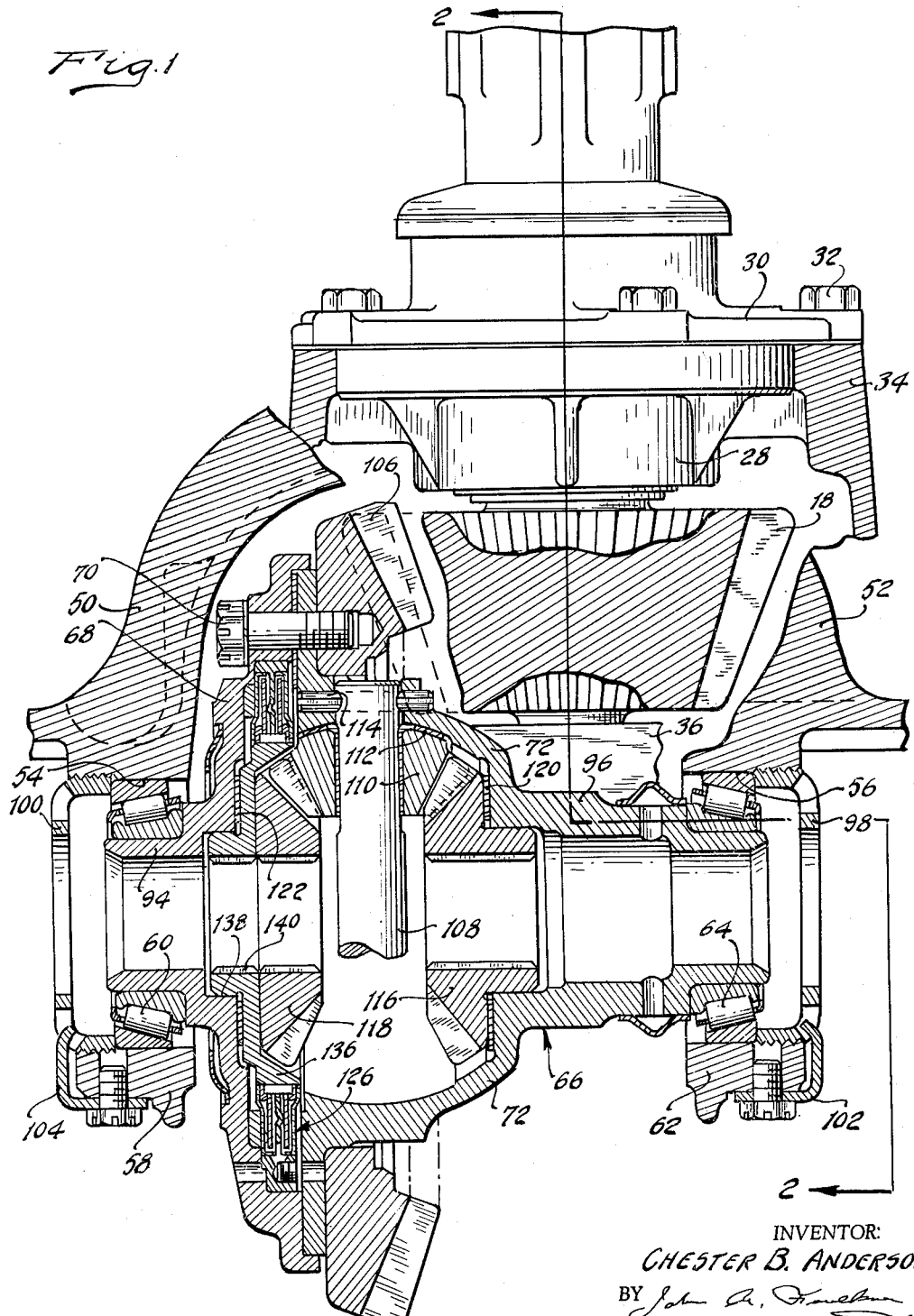
FIGURE 1 shows a partial cross-sectional view of an improved differential mechanism embodying the improvements of my invention. It is taken along the plane of section line 1—1 of FIGURE 2.
Figure 2:
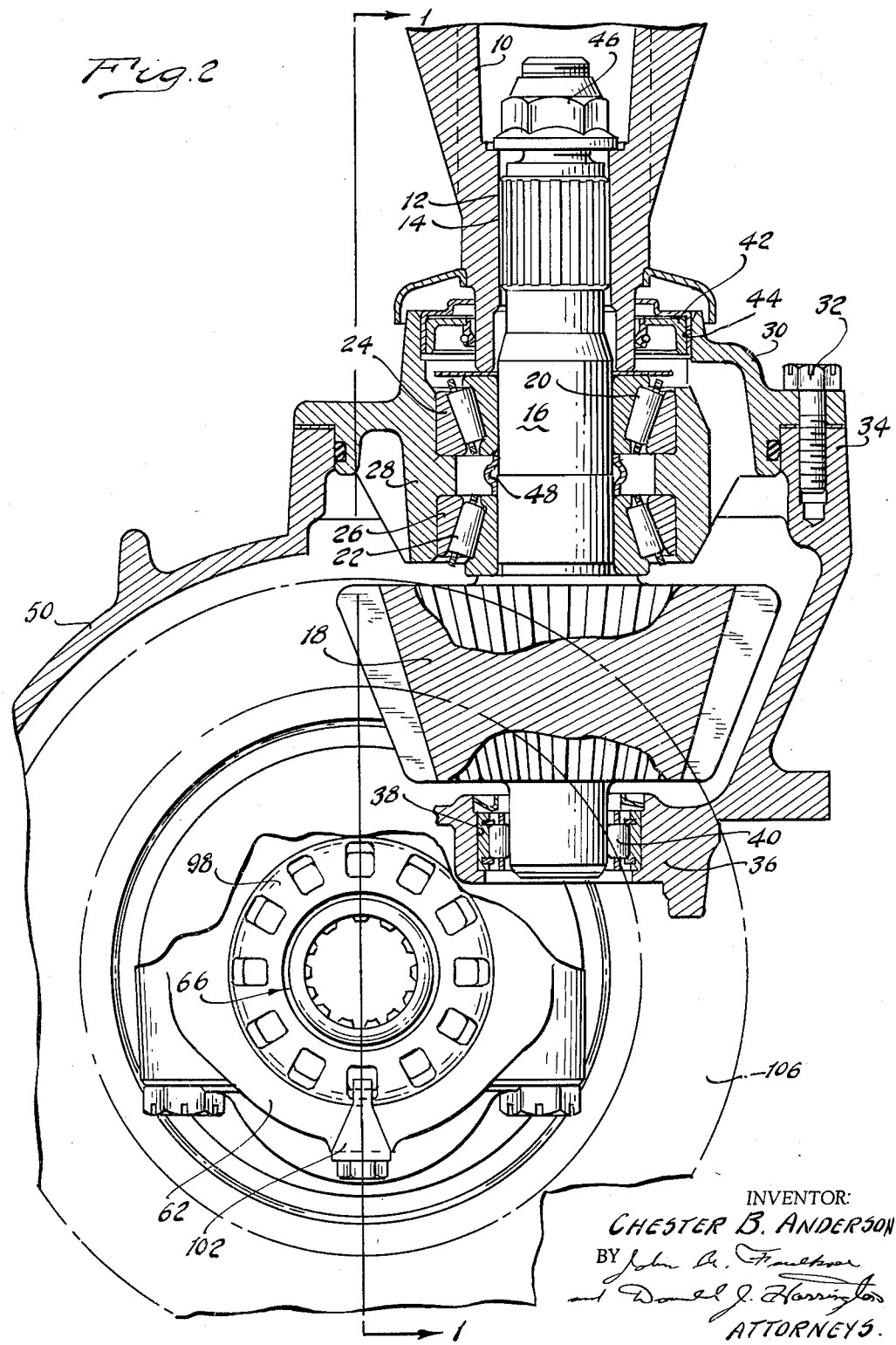
FIGURE 2 is a cross-sectional view taken along the plane of section line 2—2 of FIGURE 1.

Referring first to FIGURES 1 and 2, numeral 10 designates generally a drive flange that may form a part of a universal joint assembly that is not shown. The universal joint assembly is used to establish a driving connection with an engine driven drive shaft in a vehicle drive line. Flange 10 is formed with an internally splined opening 12 to facilitate a driving connection with an externally splined portion 14 of a driving bevel pinion shaft 16. Connected to the end of shaft 16 is a driving bevel pinion 18.

Shaft 16 and pinion 18 are journaled by means of spaced roller bearings 20 and 22. By preference, the bearings 20 and 22 include tapered rollers situated between inner and outer races. The outer race 24 of bearing 20 and the outer race 26 of bearing 22 are anchored within a bearing support sleeve 28 that forms a part of a differential housing. This bearing support sleeve is connected to an end plate 30 that is bolted by means of bolts 32 to a differential carrier housing 34.

Connected to the housing 34 is an inwardly extending wall 36 within which is formed bearing opening 38. A bearing 40 is disposed within the opening 38 to provide support for the pinion 18. This is known as a straddle mount arrangement.

A fluid seal 42 is disposed between the end of flange 10 and the surrounding opening 44 in the plate 30.

A clamping nut 46 is threadably received on the end of shaft 16. It cooperates with a shoulder formed in flange 10 to apply a clamping force to the bearings 20 and 22 which preloads them. A deformable sleeve 48 maintains the bearings 20 and 22 under load after assembly.

The housing 34 includes a portion 50 and a portion 52, each of which is provided with a circular bearing opening as indicated at 54 and 56, respectively. A bearing retainer 58 cooperates with the opening 54 to retain a bearing 60 therein. In a similar fashion, a bearing retainer 62 cooperates with the opening 56 to retain a bearing 64.

A differential carrier is indicated generally by reference character 66. It includes a first portion 68 which is bolted by means of bolts 70 to a second portion 72. Portion 68 is formed with an extension 94 which is received within and supported by bearing 60. In a similar fashion, portion 72 is formed with an extension 96 which is received within bearing 64 and rotatably supported.

A locking nut 98, which is threadably received within the opening 56, acts against the outer race of bearing 64. In a similar fashion, a locking nut 100 is threadably received within opening 54 and exerts a clamping pressure upon the outer race of bearing 60.

A locking element 102 prevents relative rotation of nut 98 with respect to the housing portion 52. Similarly, a locking element 104 prevents relative rotation of the clamping element 100 with respect to the housing portion 50.

A differential ring gear 106 is bolted to the periphery of carrier housing portion 72. It meshes drivably with the pinion 18.

An idler pinion shaft 108 extends through the carrier housing portion 72. It journals a pair of idler pinions, one of which is shown at 110. The radially outward surface of pinion 110 is crowned to permit registry with the internally crowned surface of housing portion 72. A bearing element 112 is disposed between the pinion 110 and the housing portion 72.

Shaft 108 is locked in place by a retainer pin 114 which registers with a cooperating groove formed in shaft 108. The pinions 110 engage drivably a pair of differential side gears 116 and 118. These gears are internally splined to permit a driving connection with an externally splined axle shaft. One axle shaft can be received within the extension 96 and the other axle shaft can be received within the extension 94.

A bushing 120 is disposed between adjacent shoulders formed on housing portion 72 and the differential side gear 116. A corresponding bushing 122 is provided for the differential side gear 118.

The carrier housing portion 68 includes an annular recess 124 within which a silicone fluid clutch mechanism 126 is situated. This mechanism can best be observed by referring to FIGURES 3, 4 and 5.

The mechanism 126 includes a first clutch element 128 which is annular in form and which is received within the recess 124. Provision may be made for holding the element 126 relatively fixed with respect to the carrier housing portion 68.

Element 128 includes a clutch disc 130. Situated on either side of this clutch disc 130 is a pair of discs 132 and 134 which are internally splined to an externally splined clutch member 136. The hub of the member 136 is received within a pilot opening 138 in the extension 94. It is internally splined, as shown at 140, to permit a driving connection with the externally splined axle shaft for differential side gear 118.

A clutch housing element 142 is received within the element 128 to define an annular chamber 144. The clutch disc 134 is situated within this chamber 144. In a similar fashion, a clutch housing element 146 is received within the element 128 to define an annular chamber 148 within which clutch disc 132 is situated.

A fluid seal 150 is disposed between the radially inward margin of clutch housing element 146 and the adjacent disc 132. Similarly, a fluid seal 152 is situated between the radially inward margin of clutch housing element 142 and the adjacent disc 134.

Disc 130 can be dimpled as indicated to establish a controlled degree of spacing between it and discs 132 and 134. The chambers 144 and 148 communicate with a radially extending passage 154 located on the periphery of element 128. This passage communicates with a port 156. A threaded plug may be received within the port 156 to seal the chambers 144 and 148.

I contemplate that a fitting of the type shown in FIGURE 5 may be inserted into the threaded opening 156 to facilitate filling of the clutch fluid chamber with silicone fluid. After filling, the fitting may be removed and replaced by a threaded plug. I contemplate further that a silicone fluid having a relatively high viscosity will be more successful in this application than one having reduced viscosity. A wide variety of dimethyl fluids that are commercially available would meet most design requirements.

The viscosity-temperature coefficient can be chosen as well as the viscosity itself. Several silicone fluids are Newtonian in character. That is, the ratio of the shear stress to the shear rate remains relatively constant. Other silicone fluids are non-Newtonian in character, and the viscosity at high rates of shear is less than the true viscosity. But regardless of which characteristics are chosen, the actual torque delivered by the clutch will increase as the relative motion of the differential side gear 118 with respect to the differential carrier housing increases.

During normal forward driving operation, the relative motion of the differential side gear with respect to the carrier housing is relatively slight and a minimum amount of viscous drag is then developed in the clutch. If one traction wheel begins to spin relative to the other, however, the rate of relative motion of the differential side gear 118 with respect to the carrier housing increases substantially. Under these conditions, the torque delivered through the viscous fluid of the clutch will be sufficient to establish a tractive effort on the wheel which engages the road surface having a higher traction capacity.

Having thus described a preferred embodiment of my invention, what I claim and desire to secure by United States Letters Patent is:

1. A differential drive comprising a differential carrier, a ring gear carried by said carrier, a driving pinion in driving engagement with said ring gear, said pinion being connected to a driving member, a pair of differential side gears rotatably supported by said carrier for rotation about an axis that is transverse with respect to the axis of said driving pinion, a pair of differential idler gears in driving engagement with said side gears, a driving connection between said idler gears and said carrier, means for providing a driving connection between each side gear and separate coaxial axle shafts, fluid clutch means for establishing a viscous fluid connection between one differential side gear and said carrier and comprising a first clutch element connected drivably to said differential side gear and a second clutch element connected to said carrier, said second clutch element having formed thereon a clutch disc, another clutch disc carried by said first clutch element, and clutch housing means enclosing said clutch discs and defining a sealed clutch chamber, said clutch chamber accommodating a highly viscous fluid whereby torque may be transmitted from said carrier to said one side gear through the medium of shear stresses in said fluid thereby establishing a reaction torque delivery path through said fluid that is parallel to the driving torque delivery path defined by the driving connection extending between said ring gear and said axle shafts through said one gear, said reaction torque delivery path being effective to deliver torque only when said side gears rotate relative to said carrier about their respective axes.

2. A differential drive comprising a carrier, a ring gear carried by said carrier, a driving pinion in driving engagement with said ring gear, said pinion being connected to a driving member, a pair of differential side gears rotatably supported by said carrier for rotation about an axis that is transverse with respect to the axis of said driving pinon, a pair of differential idler gears in driving engagement with said side gears, a driving connection between said idler gears and said carrier, means for providing a driving connection between each side gear and a separate axle shaft, fluid clutch means for establishing a viscous fluid connection between one differential side gear and said carrier, said clutch means comprising a first clutch element connected positively to said carrier, a first clutch disc carried by said first clutch element, a second clutch element connected to said one differential side gear, a stamped sheet metal clutch housing element carried by said one clutch element and defining therewith a sealed fluid chamber, a viscous fluid in said chamber and a friction disc carried by said second clutch element within said fluid chamber whereby shear forces may be transmitted from said carrier housing to said differential side gear through the medium of viscous fluid shear forces when said side gears rotate relative to said carrier about their respective axes, said clutch means defining a reaction torque delivery path through said fluid when said relative rotation takes place, said reaction torque delivery path being parallel to said driving connection.

3. In a differential drive, a differential carrier, a ring gear carried by said carrier, a driving pinion in driving engagement with said ring gear, said pinion being connected to a driving member, a pair of differential side gears rotatably supported by said carrier for rotation about an axis that is transverse with respect to the axis of said driving pinion, a pair of differential idler gears in driving engagement with said side gears, a driving connection between said idler gears and said carrier, means for providing a driving connection between each side gear and a separate axle shaft, and fluid clutch means for establishing a viscous fluid connection between one differential side gear and said carrier housing, said clutch means comprising a first clutch element connected positively to said carrier for rotation in unison therewith, a first clutch disc carried by said first clutch element, a second clutch element connected to one side gear, a pair of second clutch discs carried by said second clutch element, each disc of said pair being situated on opposed sides of said first clutch disc, an an annular clutch housing element connected to said first clutch element and disposed on each side of said first clutch disc to define in part a sealed fluid chamber, said chamber being adapted to accommodate a highly viscous fluid whereby torque is delivered from said first clutch element to said second clutch element through the medium of the viscous shearing forces in said fluid when said side gears rotate relative to said carrier about their respective axes, said clutch means defining a reaction torque delivery path through said fluid when said relative rotation takes place, said reaction torque delivery path being parallel to said driving connection.

References Cited by the Examiner
UNITED STATES PATENTS

| | | | |
|---|---|---|---|
| 1,481,889 | 1/24 | Carhart | 74—171 X |
| 2,629,472 | 2/53 | Sterner | 192—58 |
| 2,883,884 | 4/59 | Norton | 74—711 |

DON A. WAITE, *Primary Examiner.*